(12) United States Patent
Bella et al.

(10) Patent No.: US 7,076,030 B2
(45) Date of Patent: Jul. 11, 2006

(54) METHOD AND SYSTEM FOR TESTING XDSL WIRING

(75) Inventors: Greg Bella, Naperville, IL (US); Bill Noll, Bristol, IL (US)

(73) Assignee: Westell Technologies, Inc., Aurora, IL (US)

(*) Notice: Subject to any disclaimer, the term of this patent is extended or adjusted under 35 U.S.C. 154(b) by 694 days.

(21) Appl. No.: 10/097,966

(22) Filed: Mar. 14, 2002

(65) Prior Publication Data
US 2003/0179858 A1    Sep. 25, 2003

(51) Int. Cl.
*H04M 1/24*    (2006.01)
*H04M 3/08*    (2006.01)
*H04M 3/22*    (2006.01)

(52) U.S. Cl. .................. 379/1.03; 379/1.04; 379/2
(58) Field of Classification Search ............. 379/1.01, 379/1.03, 1.04, 29.01, 27.01, 26.01, 2
See application file for complete search history.

(56) References Cited

U.S. PATENT DOCUMENTS

| | | | |
|---|---|---|---|
| 5,357,556 A | 10/1994 | Dresser | 379/27 |
| 5,553,059 A * | 9/1996 | Emerson et al. | 370/248 |
| 5,852,630 A | 12/1998 | Langberg et al. | 375/219 |
| 6,002,671 A | 12/1999 | Kahkoska et al. | 370/248 |
| 6,181,775 B1 | 1/2001 | Bella | 379/29 |
| 6,205,522 B1 | 3/2001 | Hudson et al. | 711/147 |
| 6,212,258 B1 * | 4/2001 | Bella et al. | 379/29.01 |
| 6,212,259 B1 | 4/2001 | Kiko | 379/34 |
| 6,278,769 B1 | 8/2001 | Bella | 379/29.11 |
| 6,282,265 B1 * | 8/2001 | Lowell et al. | 379/25 |
| 6,298,046 B1 | 10/2001 | Thiele | 370/282 |
| 6,341,159 B1 * | 1/2002 | Jollota | 379/22.03 |
| 6,366,644 B1 * | 4/2002 | Sisk et al. | 379/1.04 |
| 6,466,650 B1 * | 10/2002 | Fischer et al. | 379/27.01 |
| 6,519,323 B1 * | 2/2003 | Hardy et al. | 379/29.01 |
| 6,574,308 B1 * | 6/2003 | Macdonald et al. | 379/1.04 |
| 6,798,866 B1 * | 9/2004 | Tennyson et al. | 379/1.03 |
| 6,826,155 B1 * | 11/2004 | Gershon | 370/244 |
| 6,891,803 B1 * | 5/2005 | Chang et al. | 370/252 |
| 6,909,781 B1 * | 6/2005 | Itri | 379/399.01 |
| 2002/0021787 A1 * | 2/2002 | Chea | 379/29.01 |
| 2005/0180545 A1 * | 8/2005 | Bremer | 379/22.04 |

OTHER PUBLICATIONS

International Search Report for PCT/US03/07738.
Saarela, Kimmo K., "ADSL," Tampere University of Technology, Telecommunications Laboratory, 1995.

* cited by examiner

*Primary Examiner*—Binh K. Tieu
(74) *Attorney, Agent, or Firm*—McDonnell Boehnen Hulbert & Berghoff LLP (57) ABSTRACT

In an XDSL system, a network interface device can connect between a central office and a customer premises. The network interface device can monitor for an indication to enter a test mode. In the test mode, the network interface device can provide a test signal to the central office, which can be used to test central office equipment and transmission lines connecting the network interface device with the central office. The network interface device can also provide the test signal to the customer premises, and the test signal can be used to test customer premises wiring and equipment.

31 Claims, 8 Drawing Sheets

METHOD AND SYSTEM FOR TESTING XDSL WIRING

FIELD OF THE INVENTION

This invention relates generally to XDSL transmission systems. More specifically, it relates to a system and method for testing transmission lines in an XDSL transmission system.

BACKGROUND OF THE INVENTION

Traditional twisted-pair telephone lines can be used to provide voice telephone service to customers. A central office can connect to a user premises via a telephone line, such as a twisted-pair copper line. Once at the user premises, the telephone line may connect to customer wiring within the customer premises. The customer wiring may split into more than one branch, and it may run to various different locations within the customer premises. Plain old telephone service ("POTS") devices, such as analog telephones, can connect to the customer wiring. Through the customer wiring the POTS devices can interface with the central office and ultimately communicate with other devices also connected to the telephone network.

In additional to carrying voice calls, a telephone line can also carry data. For example, computers, fax machines or other data devices can connect with the customer wiring, and through the connectivity provided by the central office, they can communicate with other data devices on the telephone network. In this type of configuration, the data is transmitted over the bandwidth generally allocated for voice calls. The bandwidth for voice calls is generally limited, and this also limits the data transmission rate. Additionally, a traditional telephone line generally cannot support simultaneous data and voice transmissions.

XDSL is a technology that overcomes some of the limitations of POTS service. The acronym XDSL generally identifies the broad class of "digital subscriber line" services. The letter "X" in the general acronym can be replaced with another letter to identify a specific type of digital subscriber line service, such as asymmetric digital subscriber line service ("ADSL") service or high-bit-rate digital subscriber line ("HDSL").

Using XDSL, the bandwidth of the telephone line can be extended to support higher speed data communications. For example, by changing bandwidth-limiting filters on the telephone network, the overall available bandwidth for a telephone line connected to a customer premises can be increased. A portion of the available bandwidth can be used to support POTS services, such as voice calls. Another portion of the bandwidth can be used to support higher speed data communications. Other techniques, such as echo cancellation, can also be used to increase the data communication rate.

Various problems may occur within an XDSL transmission system. For example, in order for an XDSL transmission system to function properly, POTS devices located on the customer premises should be electrically isolated from the XDSL devices through the use of in-line filters. A POTS device not using a filter may adversely affect the data transmission rate of the XDSL devices. In another example, physical problems with the customer premises wiring or the telephone lines may develop.

When these problems occur, XDSL customers may make a service request to their XDSL service provider to diagnose and correct the problem. The service provider may be able to remotely isolate the customer premises equipment and wiring from the network-owned equipment and wiring, and then the service provider can test the telephone line from the network demarcation to the central office. This method may detect a problem on the network-owned equipment or wiring, but it would not detect a problem in the customer wiring. If a problem developed on both the network wiring line and the customer premises, this method would not be able to detect both problems.

Alternatively, the service provider can make an on-site service call to the customer premises. At the customer premises, a service technician can connect one or more test devices in order to test the telephone lines linking the customer premises and the central office. Once at the customer premises, the service technician can also test the customer wiring. This method could diagnose problems both with the telephone line and with the customer wiring; however, it has several disadvantages.

On-site service calls can be expensive. They require the service technician to travel to the customer premises, and they require time to connect the test equipment and to diagnose any problems. Often times, the responsibility for problems with the telephone lines are placed on the service provider, while the customer pays the costs for any problems relating to the customer wiring. Therefore, placing a service call in order to diagnose a problem on the customer premises, such as not installing an in-line filter on a POTS device, is not cost-effective for the customer.

In addition to cost, there are other disadvantages to diagnosing problems in this manner. For instance, there may be a significant delay between the time a customer places a service call and the time the service technician arrives at the customer's premises. This may cause the customer to be without XDSL service, or to have impaired XDSL service, while the customer waits for the service call to be performed.

Therefore, there exists a need for a better way to perform diagnostic testing in an XDSL system.

SUMMARY OF THE INVENTION

In an XDSL system, a network interface device can connect a central office and a customer premises. The network interface device can generally serve as a demarcation point between customer equipment and wiring, which can be located within the customer premises, and network equipment and wiring, which can be located outside the customer premises. The network interface device can be used to test the network equipment and wiring, and it can be used to test the customer equipment and wiring.

The network interface device can operate in a normal mode. In the normal mode, the network interface device can connect the central office and the customer premises. The network interface device can also monitor for a signal to enter a test mode. When the network interface device detects the signal to enter a test mode, the network interface device can effectively isolate the central office from the customer premises. The network interface device can sent a test signal to the central office, which can be used to test the network equipment and wiring. The test signal can also be sent to the customer premises, and it can be used to test the customer equipment and wiring.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
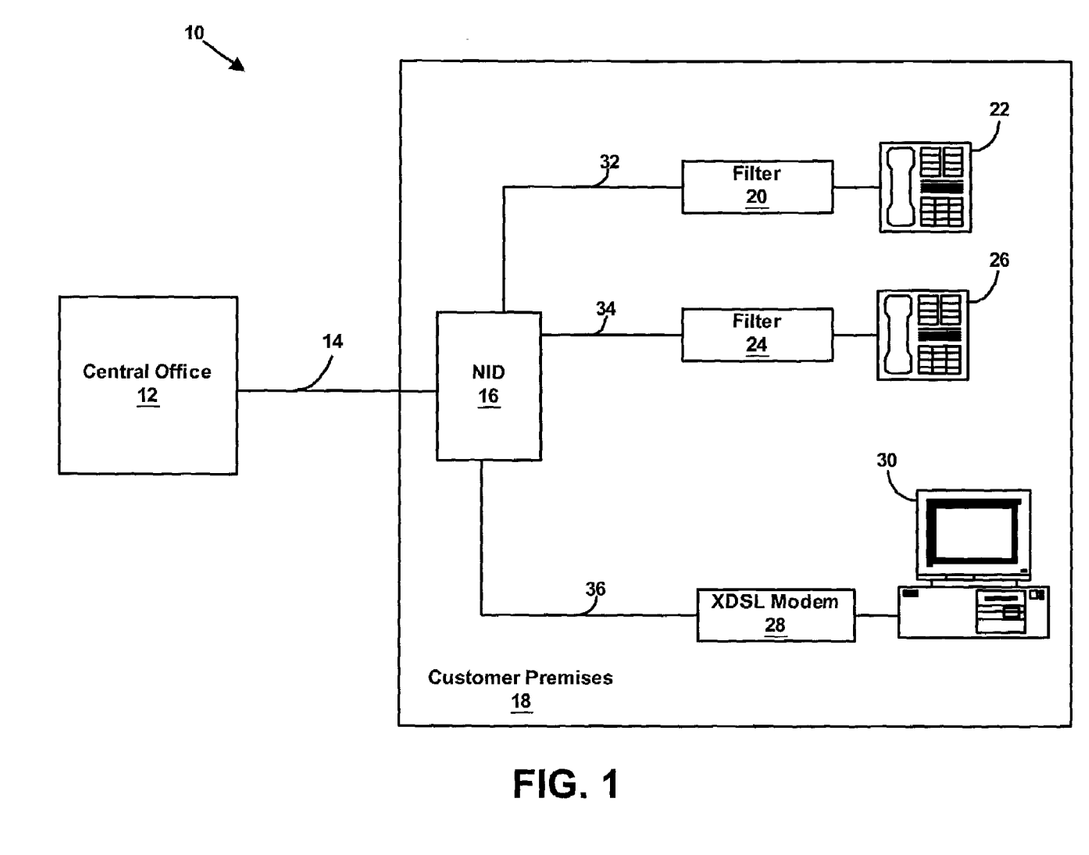
FIG. 1 is a block diagram of an XDSL system that can be used to practice the exemplary embodiments.

FIG. 1 shows an exemplary XDSL system 10 that can be used to practice the exemplary embodiment. A central office 12 connects to network interface device ("NID") 16 through a transmission line 14. The transmission line 14 is ordinarily a twisted-pair copper wire transmission line, such as the type use to provide plain old telephone service ("POTS"); however, other types of wiring may also be used.

The transmission line 14 connects to the NID 16, which is ordinarily located at the interface between the central office 12 and a customer premises 18. For example, the NID 16 can be located at the entry point of the transmission line 14 into the customer premises 18. The actual physical location of the NID 16 can vary. As shown in FIG. 1, the NID 16 can be located inside the customer premises 18 and connected to the transmission line 14. Alternatively, the NID 16 may be located outside the customer premises 18 and connected to the transmission line 14. The NID 16 may also be located at other locations within the XDSL system 10.

In addition to interfacing with the central office 12 through the transmission line 14, the NID 16 can also interface with one or more devices located on the customer premises 18. The devices on the customer premises 18 may be, for example, XDSL devices, POTS devices or other devices. The NID 16 generally provides an interface between the transmission line 14 and customer premises wiring 32, 34, 36. For example, multiple customer premises wiring links 32, 34, 36 can split from the NID 16 and run to one or more devices located within the customer premises 18. Through the customer wiring links 32, 24, 36, devices can connect with the NID 16 and ultimately with the central office 12.

The NID 16 can connect to one or more XDSL devices within the customer premises 18. For example, the NID 16 can connect to an XDSL computer 30 over customer wiring link 36. The connection between the NID 16 and the XDSL computer 30 can be made through an XDSL modem 28. The XDSL modem 28 generally handles the XDSL signaling used for communication with the central office 12. The XDSL modem 28 can receive signals sent over the transmission line 14, decode the signals and provide the signals to the computer 30. The XDSL modem 28 can also receive data from the computer 30, encode the data into an XDSL signaling format and send the data over the customer wiring link 36 and the transmission line 14 to the central office 12.

While FIG. 1 depicts the XDSL modem 28 as a separate component from the computer 30, it may also be integrated into the computer 30. Other XDSL devices can also connect to the NID 16 via customer wiring links, and these devices may be in addition to or in place of the computer 30. While FIG. 1 depicts the computer 30 as a single XDSL device connected to the NID 16, the NID 16 may also support a greater or fewer number of XDSL devices.

In the example shown in FIG. 1, two POTS telephones 22, 26 also connect to the NID 16. POTS telephone 22 connects to the NID 16 over customer wiring link 32, and POTS telephone 26 connects to the NID 16 over customer wiring link 34. The two POTS telephones 22, 26, which do not support XDSL communication, receive POTS service from the central office 12. In order to communicate with the central office 12, the POTS telephones 22, 26 use the same customer wiring links 32, 34, 36 and transmission line 14 that are used for the XDSL service.

In order to prevent the POTS devices 22, 26 from interfering with the XDSL signaling, they connect to the customer wiring 32, 34 through filters 20, 24. One POTS telephone 22 connects to the ND 16 through a filter 20, and a second POTS telephone 22 connects to the NID 16 through a filter 24. The filters 20, 24 can be micro-data filters that appear as a high-impedance termination to the NID 16 and the XDSL modem 28 in the XDSL frequency range. The filters 20, 24 can look like a low impedance in the voice frequency range so as to seamlessly pass POTS voice and ringing signals. By isolating the POTS telephones 22, 26 from the NID 16 as high-impedances, the filters help prevent the POTS telephones 22, 26 from interfering with the XDSL signaling on the customer wiring links 32, 34, 36 and the transmission line 14. While the filters 20, 24 are shown as separate components from the POTS telephones 22, 26, they may alternatively be integrated into the telephones 22, 26. Other POTS devices can connect to the NID 16, and a greater or fewer number of POTS devices may be connect to the NID 16.

Various different problems may develop within the XDSL system 10 that may affect its performance. For example, faulty wiring within the customer premises 18 can reduce the data transmission rate in the XDSL system 10. Additionally, wiring problems on the transmission line 14 can adversely affect the system's performance. As previously described, improperly terminated devices, such as POTS devices not having filters, can also reduce the system's data transmission rate. Other problems can also develop. The various problems may occur within the customer premises 18, or they may occur outside the customer premises 18, such as on the transmission line 14 or at the central office 12.

In order to correct a problem within the XDSL system 10, the problem should be located, for example, by determining where in the XDSL system 10 the problem is located. The can be done using the NID 16. The NID 16 can include circuitry for isolating transmission problems within the XDSL system 10. The circuitry can be used, for example, to determine if a problems lies within the customer premises 18, or if the problem lies in the transmission line 14 or at the central office 12.

Figure 2:
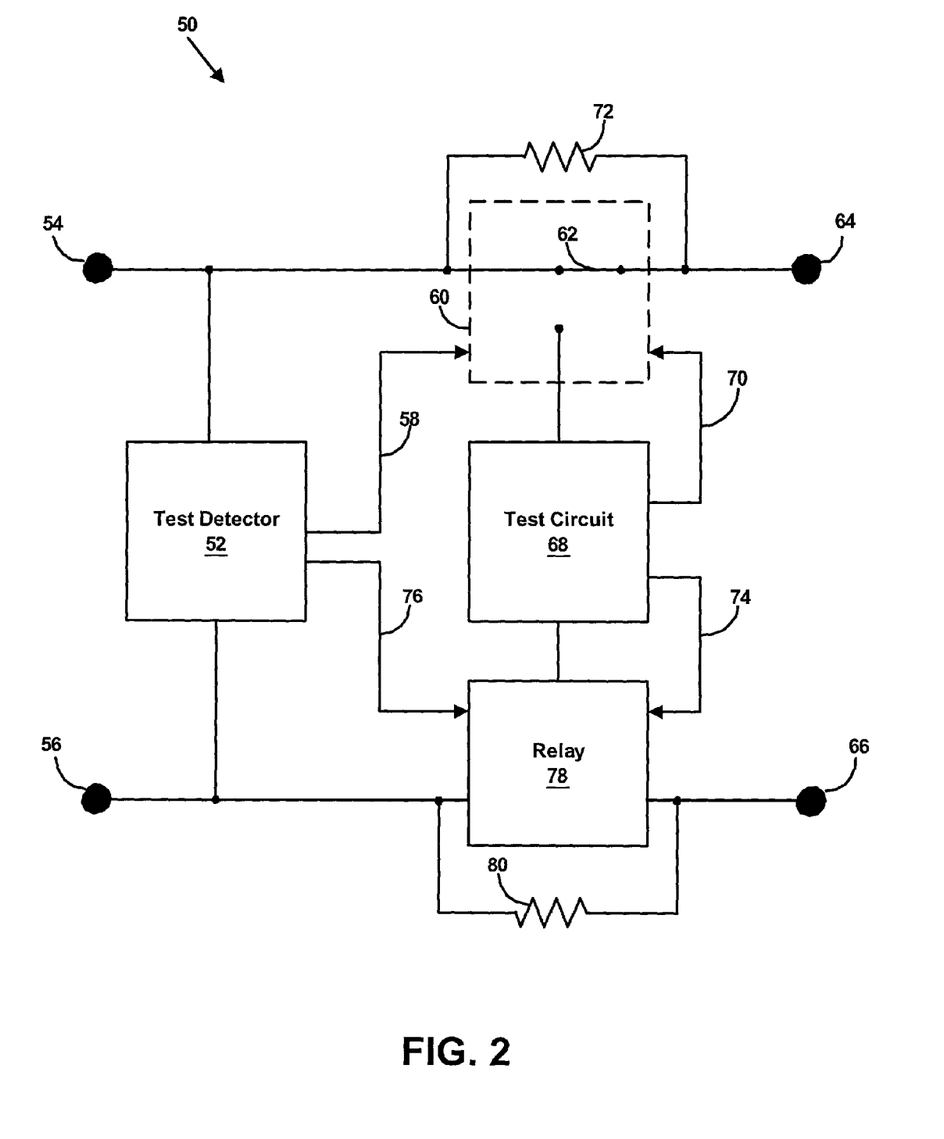
FIG. 2 is a block diagram of one implementation of a network interface device that can be used to test customer wiring and XDSL transmission lines connected to a central office.

FIG. 2 depicts an implementation of the NID 50 that can be used to test the XDSL system 10. The NID 50 can operate in a normal operation mode and a test mode. In the ordinary transmission mode, the NID 50 can pass XDSL and other signals between the customer premises 18 and the central office 12. The NID 50 can also operate in a test mode. In the test mode, the NID 50 may provide one or more test signals to the central office 12 and to the customer premises 18. The test signals can be used to locate problems in the XDSL system 10 and to identify whether the problems originate in the customer premises 18 or outside the customer premises 18.

With continued reference to FIG. 2, the NID 50 is depicted in the normal operation mode. Two terminals 54, 56 can be used to connect the NID 50 to the twisted-pair transmission line 14 connected to the central office 12. At the other end of the NID 50, two additional terminals 64, 66 can be used to connect the NID 50 to the twisted-pair wiring in the customer premises 18. The customer wiring connected to terminals 64 and 66 can split into one or more links connect to devices within the customer premises 18. During normal operation, terminals 54 and 64 are electrically connected and can share a common voltage. Likewise, during normal operation, terminals 56 and 66 can be electrically connected and can share a common voltage. This configuration allows the NID 16 to serve as an interface between the customer premises 18 and the transmission line 14 by electrically connecting the two entities.

The NID 16 can include test circuitry, which can be disconnected from the terminals 54, 56, 64, 66, during the normal operation mode. A test detector 52 can be used to receive an indication to change from the normal operation mode to the test mode. The test detector 52 can be wired across terminals 54, 56 and connected to these terminals during the normal operation mode. The test detector 52 can be a high impedance circuit, and the high impedance of the test detector 52 can prevent the test detector from interfering with the operation of the NID 50 in the normal operation mode.

The test detector 52 should appear as a high impedance in the POTS frequency range and the ADSL frequency range. By appearing as a high impedance in the POTS frequency range, the test detector 52 will generally not cause a false "receiver off-hook" signal to be sent to the central office PSTN ("public switched telephone network") switch nor will it generally cause a false ring trip when a 20 Hz ringing signal is sent. The high impedance in the ADSL range generally prevents the test detector 52 from loading down the ADSL signals and causing a decrease in the data-rate or margin. The test detector 52 should also only cause a low harmonic distortion in the ADSL frequency range. This can help prevent the high level upstream signals from clipping and causing harmonic distortion harmonics in the downstream ADSL signal.

Since the test detector 52 connects across the terminals 54 and 56, the test detector 52 can monitor normal data transmissions between the central office 12 and the customer premises 18 for an indication to enter the test mode. The indication can be sent from the central office 12 and can be detected by the test detector 52. In the normal operation mode, one terminal 54 connects to another terminal 64, and one terminal 56 connects to another terminal 66. Therefore, the test detector 52 can also receive an indication to enter the test mode that is sent from within the customer premises 18. For example, the computer 30 may send an indication to enter the test mode, which can be received by the test detector 52.

The indication to enter the test mode may take a variety of different forms. In one merely exemplary embodiment, the indication is a short between terminals 54 and 56. However, of course, a variety of unique signals or other types of indicators to enter the test mode may be used. Thus, the central office 12 could create a short through the transmission line 14 between terminals 54 and 56, thereby altering the test detector 52 to enter the test mode. Alternatively, a device on the customer premises 18 may create a short between terminals 64 and 66, which in the normal operation mode would also create a short between terminals 54 and 56. The short could alert the test detector 52 to enter the test mode.

In one example, the XDSL modem 28 may include circuitry to create and send the indication to the test detector 52. The XDSL modem 28 may be controlled, for example, by the computer 30. In one embodiment, a user may interact with the computer 30 through a user interface displayed on a screen or other output device. The user can select the test mode by making an appropriate entry to the user interface. In response to the user's selection, the computer 30 could send the indication to enter the test mode to the test detector 52, or the computer may cause the XDSL modem 28 to send the indication to enter the test mode to the test detector 52. For example, in response to the user's selection, the XDSL modem 28 may cause a short on customer wiring line 36. The short may be detected by the test detector 52 and used as an indication to enter the test mode.

In one embodiment, the user may be able select the test mode from a list of option during the normal course of XDSL service. In another embodiment, the option to enter the test mode may be "concealed" from the user. After placing service call to the XDSL service provider, the service provider may inform the customer of how to access the concealed menu function to enter the test mode. Other variations are also possible. Additionally, other devices on the customer premises 18 may also be used to send the indication to enter the test mode.

In addition to a short, other indicators may also be used to signal to the test detector 52 to enter the test mode. For example, the test detector 52 could identify a predetermined signal or sequence of signals. Once the test detector 52 receives the predetermined signals or sequence of signals, the test detector 52 could cause the XDSL system 10 to enter the test mode. Alternatively, the test detector 52 may respond to multiple different indications to enter the test mode. For example, the test detector 52 may respond to a short and it may also respond to a predetermined sequence of signals. Other combinations can also be used.

The test detector 52 can be implemented by a variety of different devices, and these may vary depending on the indicator used. For example, the test detector 52 may be implemented by a combination of digital and analog circuit elements. Alternatively, the test detector 52 may be a programmed logic device, such as a programmable array logic ("PAL"), an application-specific integrated circuit ("ASIC"), an erasable programmable read-only memory ("EPROM"), electrically erasable programmable read-only memory ("EEPROM") or another type of logic device. The test circuit 68 may be a combination of analog, digital or programmable logic devices, or it may be another type of implementation.

After receiving the indication to enter the test mode, the test detector 52 can connect a test circuit 68 to the transmission line 14 and to the customer premises 18. The test circuit 68 can be disconnected from the transmission line 14 and the customer premises 18 in the normal operation mode, and it can be connected to the transmission line 14 and the customer premises 18 in the test mode. The test circuit 68 can be used to locate problems within the XDSL system 10, such as by identifying whether the problem originates in the transmission 14 and the central office 12 or whether it originates in the customer premises 18.

Once in the test mode, the test circuit 68 can produce a test signal. As those of ordinary skill will recognize, the test signal can take a variety of different forms. For example, the test signal can be a predetermined sequence of tones. The tones may vary in amplitude and they may be sent over various frequencies. Preferably, the tones are sent for a predetermined amount of time. In another exemplary embodiment, the test signal may be a single tone transmitted over one or more frequencies, or it may be another type of signal. The test signal may also be a discrete multi-tone implementation similar to ADSL transmission standards or other encoding techniques, such as 2B1Q or CAP modulation. The test signal can be transmitted over the wiring to the central office 12 and to the customer premises 18.

With continued reference to FIG. 2, the test detector 52 can connect to a relay 60 through a control line 58, which can control the relay 60. The relay 60 can be used to connect and disconnect the test circuit 68 from the terminals 54, 56, 64, 66. While FIG. 2 depicts a relay 60, a switch or other device could of course be used to make the selectable connection. Alternatively, the relay 60 or other device could be controlled the test circuit 68, by other control logic that may be added to the NID 50 or by another device.

The relay 60 can have two operating positions. In a first position used for the normal transmission mode, the relay 60 can connect terminals 54 and 64. In the first position, as depicted in FIG. 2, the test circuit 68 can be electrically isolated from terminals 64 and 54. A pole 62 in the relay 60 can connect terminals 54 and 64. The pole 62, however, leaves an open connection between the test circuit 68 and the terminals 54 and 64. Since no current flows across an open connection, the relay 60 electrically isolates the test circuit 68 from the common potential created across the connection of terminals 54 and 64.

A similar configuration can be used for the connection of terminals 56 and 66. The test detector 52 connects to a relay 78 through a control line 76. In the normal transmission mode, the relay 78 electrically connects terminals 56 and 66, and it isolates the test circuit 68 from that connection. In this mode, current flows through the relay 78 between terminals 56 and 66.

In an alternate embodiment, relay 60 and relay 78 could be implemented as a single double pole, double throw relay. Relay 60 could represent one of the poles of the double pole, double throw relay, and relay 78 could represent the second pole. In this embodiment, the two control lines 58, 76 could be combined into a single control line running to the double pole, double throw relay. The single control line can control the two poles of the relay, and the poles can be set and reset at the same time.

A resistor 72 can also connect across the relay 60. In this normal transmission mode configuration, the resistor 72 is in parallel with the connection of terminals 54 and 64 by the relay 60. In this parallel configuration, the relay 60 electrically links terminals 54 and 64, and the resistor 72 also electrically links terminals 54 and 64. During the operation of this circuit, current will bypass the resistor 72 and flow through the relay 60. This occurs because, according to Ohm's law, current tends to travel along the path of least resistance. Since the electrical connection of the relay 60 provides less resistance than the resistor 72, the current will bypass the resistor 72 and flow through the relay 60. Therefore, the resistor 72 will not affect the transmission of signals between terminals 54 and 64. Likewise, a resistor can connect 80 can across the second relay 78. Current can flow through the relay 78 between terminals 56 and 66, and the current can bypass the resistor 80 connected across the relay 78.

Once the test detector 52 receives an indication to enter the test mode, the test detector 52 can connect the test circuit 68 to terminals 54, 56, 64, 66. This can be done by sending a signal over the control line 58 to the relay 60. In turn, the relay 60 can move to a second position, thereby connecting the test circuit 68 to the terminals 54, 56, 64, 66. A similar process can occur for the other relay 78.

Figure 3:
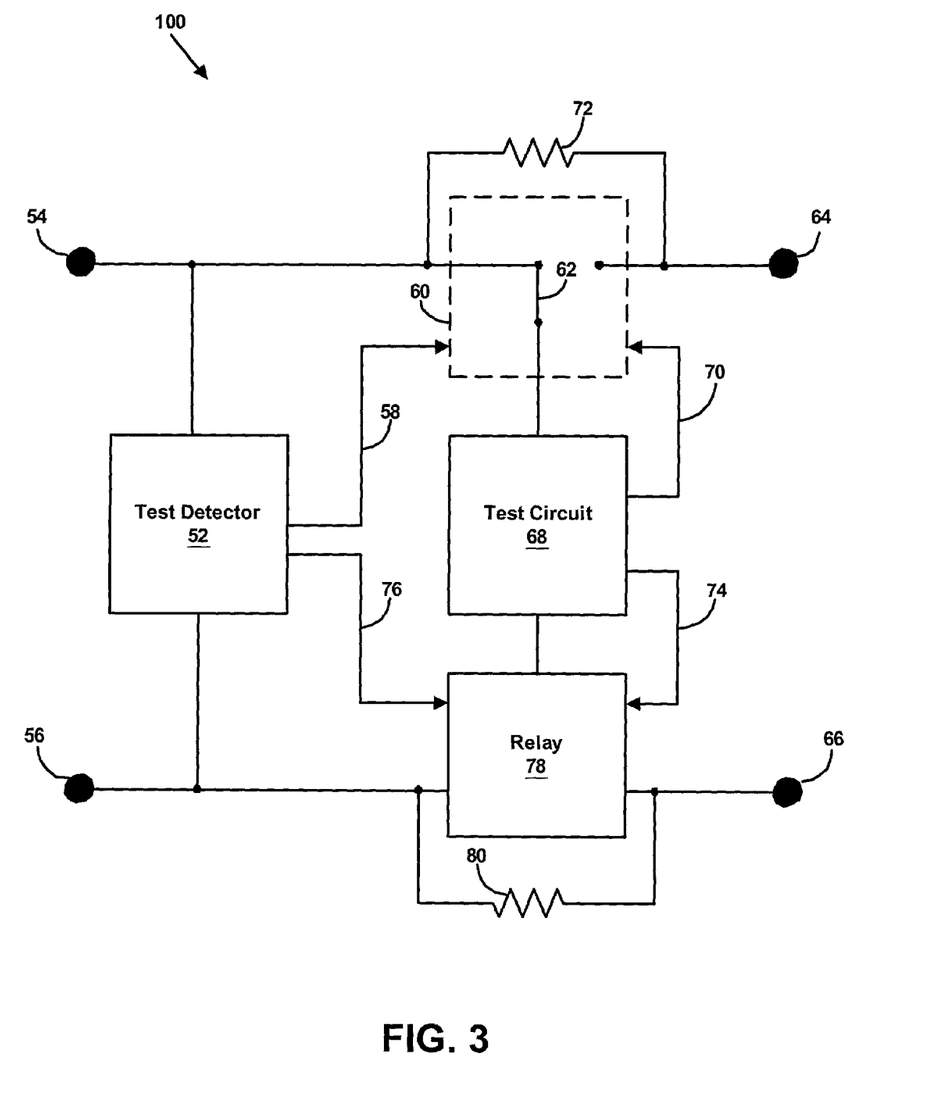
FIG. 3 is a block diagram of the network interface device of FIG. 2 in a test mode.

FIG. 3 shows the NID 100 in the test mode. In response to an indication to enter the test mode received by the test detector 52, the test detector 52 can connect the test circuit 68 to the terminals 54, 56, 64, 66. With reference to the relay 60 depicted in FIG. 3, the relay pole 62 has changed from the first position to the second position. In the first position, as depicted in FIG. 2, the test circuit connects to terminal 54, thereby creating a common potential between terminal 54 and test circuit's connection to the relay pole 62. Current can flow directly between terminal 54 and the test circuit 68. In this configuration, however, the test circuit 68 does not connect directly to terminal 64, because of the gap created by moving the relay pole 62 from the first position to the second position. Since no current flows through the gap, no current flows directly between the test circuit 68 and terminal 64. The test circuit 68, however, connects to terminal 64 through the resistor 72. Current can flow from the test circuit 68, through the resistor 72, to terminal 64. A similar operation can occur between relay 78, resistor 80 and terminals 56 and 66.

Once in the test mode, the test circuit 68 can produce a test signal. The test signal can take a variety of different forms. The test signal can be, for example, a predetermined sequence of tones. The tones may vary in amplitude and they may be sent over various frequencies. For example, the test circuit 68 may send a sequence of tones from 25 KHz to 1 MHz, and they may include quiet termination, such as when no tones are sent. In this mode, the transmission line 14 to the central office 12 is terminated by the test circuit at approximately 135 ohms. The test signal may also be another type of signal. Preferably, the test signal is sent for a predetermined amount of time. This predetermined amount of time can vary, but preferably the test signal is sent for a long enough period of time to allow tests to be performed at the customer premises 18 and at the central office 12.

The test circuit 68 can be implemented in a variety of different ways. The implementation of the test circuit 68 may vary depending on the type of test signal used in the XDSL system 10. The test circuit 68 may be implemented by a combination of digital and analog circuit elements. Alternatively, the test circuit 68 may be a programmed logic device. For example, it may be a programmable array logic ("PAL"), an application-specific integrated circuit ("ASIC"), a digital signal processor ("DSP"), a microprocessor or another type of logic device. The test circuit 68 may be a combination of analog, digital or programmable logic devices, or it may be another type of implementation.

Once generated by the test circuit 68, the test signal can be transmitted to the central office 12 and to the customer premises 18. Specifically, the test circuit 68 may transmit the test signal through relay pole 62 to terminal 54 and out to the central office 12. Likewise, the test circuit 68 can send the signal through relay 78 to terminal 56 and to the central office 12, thereby creating a loop between the central office 12 and the test circuit 68. Generally, the test signal is a differential signal sent simultaneously through both relays.

The two resistors 72, 80 also couple the test signal onto the customer wiring located within the customer premises 18. The test signal can flow from the test circuit 68 through the resistor 72 to terminal 64, which can be connected to the customer premises 18. Similarly, the test signal can flow from the test circuit 68 through the second resistor 80 and to terminal 66, which can also be connected to the customer premises. This flow can create a current loop between the test circuit 68 and the customer premises 18. Generally, the test signal is a differential signal, and it is sent simultaneously through both relays to the customer premises 18. The test signal can be transmitted across the customer wiring links 32, 34, 36, and it can be received by devices on the customer premises 18 that are connected to the NID 100 by the customer wiring links 32, 34, 36, such as the computer 30.

The values of the resistors 72, 80 can be chosen to effectively isolate the customer premises 18 and the central office 12 in the test mode configuration. By effectively isolating the customer premises 18 from the central office 12, problems can be more accurately traced to their source. The resistor values can also be chosen based on the configuration of the XDSL system 10 and transmission effects, such as attenuation of signals sent from the NID 14 to the central office 12 or to the customer premises 18.

In an ordinary XDSL system, the impedance looking from the test circuit 68 toward the central office 12 is roughly 100 to 135 ohms, although the actual value may vary depending on conditions within the XDSL system. The transmission line 14 connecting the NID 14 and the central office 12 may be on the order of several kilometers. Therefore, a significant attenuation may occur for the test signals sent from the test circuit 68 to the central office 12. Consequently, the signals sent from the test circuit 68 to the central office 12 should be sent with a high enough voltage in order to be received at the central office 12 and differentiated from noise on the transmission line 14.

In one exemplary embodiment, the test signals are launched at the maximum level while still drawing less a relatively small amount of line current, for example less than 20 mA of line current. Many subscriber line interface circuits limit the POTS battery feed current to less than 25 mA. In one embodiment, the test signals launch at 0 dBm into 135 ohms. Higher levels may also be possible within the 20 mA current limit. For example, at 10 dBm, the peak current draw due to driving the transmission line would be approximately 12 mA.

The amount wiring within the customer premises 18 is ordinarily significantly less than the length of the transmission line 14. For instance, the wiring within the customer premises 18 may be on the order of a few hundred meters. Also, the wiring within the customer premises 18 may have a greater signal-to-noise ratio than the transmission line 14. As a consequence of the improved performance of the customer wiring over the transmission line 14, test signals sent from the test circuit 68 to the customer premises 18 may be less attenuated. Therefore, signals on the customer premises 18 may be detected at a lower voltage level than signals on the transmission line 14.

Since the test signals to the customer premises 18 can be differentiated from noise more easily than signals on the transmission line 14, the test signals can be sent to the customer premises 18 at a lower voltage. In order to send lower voltage test signals to the customer premises 18, the values of resistors 72 and 80 can be set higher than approximately 135 ohm resistance looking toward the central office 12. For example, the resistors 72, 80 can each have a resistance of 1000 ohms. The lower level signal can be advantageous to minimize power draw from the transmission line 14. It can also simplify the implementation to isolate the customer premises 18 from the central office 12 and transmission line 14. A single line driver can be used to drive both the transmission line 14 and to drive the customer premises wiring. Since the source impedance to the customer wiring is about 2000 ohms, a direct customer short will generally not load down the line driver. As the line driver is designed to drive 135 ohms through a 135 ohm source (i.e., approximately 270 ohms), this is an order of magnitude less than the customer source impedance and will generally not be loaded down by a customer short.

Setting the resistance to 1000 ohms can reduce the voltage sent from the test circuit 68 to the customer premises 18. At the customer premises 18 the voltage sent from the test circuit 68 can be measured, for example, by the XDSL modem 28. The XDSL modem 28 generally already includes a digital signal processor ("DSP") or other processor, which can be used to perform various processing functions in the XDSL modem 28. The DSP 28 can also be used to recover signals attenuated by the customer wiring. For example, it may recover test signals attenuated by 60 dB or more. In one embodiment, the DSP can measure and record sine-wave tones or other signals at amplitudes of 0 to 70 dBm. Other circuitry on the XDSL modem 28 may also be used. The DSP can have a high sensitivity and measure relatively small signals. This can be, for instance, because of the high signal-to-noise ratio on the wiring inside the customer premises 18 and also because the shorter distance of the wiring causes less attenuation of signals.

The XDSL modem 28 can detect the test signal tones sent from the test circuit 68 and determine if their amplitude is acceptable. The XDSL modem 28 can then record the results. If the customer wiring is doesn't have any significant problems, for example if all POTS devices (e.g., phones, faxes, etc. . . . ) have an in-line microdata filter, then the XDSL modem 28 should measure the tones in the XDSL downstream spectrum (e.g., 170 KHz–1 MHz for ADSL) at a level of, for example, approximately –26 dBm. The level of the measured tones, however, can vary based on different conditions of the wiring inside the customer premises 18, and an ordinary value may be higher or less than –26 dBm. This value can also change based on the values of the resistors 72, 80.

However, a problem may occur on the wiring within the customer premises 18. For example, a POTS device may be connected to the wiring without an in-line microdata filter. This can cause a high frequency range short or attenuation on the wiring within the customer premises 18. Consequently, the test signal may be attenuated from the expected amplitude of –26 dBm, thereby signaling the XDSL modem 28 that a problem exists with the customer wiring. Other problems, such as faulty wires, cut wires, device problems, can also cause a high frequency short or attenuation in the voltage measured by the XDSL modem 28.

Other devices may also be used to measure the test signals sent from the test circuit 68. For example, the computer 30 may include circuitry to receive and measure the test signals, or the computer 30 may process the test signals in conjunction with the XDSL modem 28. Another XDSL device may also perform the signal analysis, or a specific device designed to test the XDSL wiring in the customer premises 18 may also be used. More than one device connected to the customer premises wiring may simultaneously measure and analyze the test signals.

Similarly, the central office 12 can also measure test signals sent from the test circuit 68. The central office can compare the level of the signals received from the test circuit 68 against an expected level under normal operating conditions. Decreases in the level of the signal received can indicate a problem within the central office 12 or on the transmission line 14. The launch amplitude of the test signal to the central office 12 could be approximately 0 dBm into 135 ohms. The amplitude measured by the central office 12 could then vary according to the transmission line conditions. Higher launch amplitudes can be sent at a predetermined level; however, the current draw from the transmission line should preferably be less than 20 mA.

Preferably, the test signal is transmitted for a predetermined amount of time. The predetermined amount of time should be long enough for a device on the customer premises 18 and for the central office 12 to conduct their tests of the wiring. After the predetermined amount of time, the test circuit may be disconnected from the customer premises 18 and the central office 12. For example, after the predetermined amount of time, the test circuit 68 may send a control signal over control line 70 to the relay 60. In response to the control signal, the relay 60 may move the relay pole 62 from the second position back into the first position, thereby disconnecting test circuit 68 from terminal 54. Similarly, the test circuit 68 may send a control signal over control line 74 to relay 78. In response to the control signal, relay 78 may move from the second position back to the first position, thereby disconnecting test circuit 68 from terminal 56. While FIG. 2 depicts the test detector 52 and the test circuit 68 both controlling the relays 60, 80, the relays 60, 80 may alternatively be controlled by only the test detector 52, only the test circuit 68, or by one or more other elements. In another embodiment where the relays 60, 80 are a single double pole, double throw relay, the test circuit may send a single control signals that changes both poles back to the first position.

The operation of the NID 50 can be advantageously adjusted by setting the values of the resistors 72, 80, and the values of the resistors 72, 80 can have an impact on the ability of the central office 12 and the customer premises 18 to detect and locate problems within the XDSL system 10. By setting the values of the resistors 72, 80 to a high enough value, the customer premises 18 can be effectively isolated from the test circuit's loop with the central office 12. Looking toward the central office 12, the test circuit 68 sees a termination of approximately 135 ohms. Looking toward the customer premises 18, the test circuit 68 sees the two resistors 72, 80 in series with the customer termination. Setting the resistors 72, 80 to have resistance of approximately 1000 ohms can reduce the effects of the customer premises 18 on the test circuit's loop with the central office 12.

For example, a short can exist on the customer premises 18. The test circuit 68 can see the short through the two 1000 ohm resistors 72, 80 in series. The series configuration and the higher values of the resistors 72, 80 (i.e., 2000 ohms is much higher than the 130 ohm termination resistance looking toward the central office 12) can prevent the short from loading down the loop with the central office 12. Since, the customer premises 18 can be isolated from the central office 18, problems on the customer premises 18 can have only a negligible effect on the central office 12 side, and problems with the central office 12 loop can have only a negligible effect on the customer premises 18 side. This can allow the central office 12 and the customer premises 18 to determine the location of a wiring problem.

The values of the resistors 72, 80 can be varied to isolate the effects of problems on the customer premises 18 from the central office. Increasing the values of the resistors 72, 80 correspondingly increases the isolation between the central office 12 and the customer premises 18. Problems on the customer premises 18 will have less of an effect on the test voltages measured by the central office 12. However, increasing the values of the resistors 72, 80 can decrease the signals levels measured by the XDSL modem 28. If the values of the resistors 72, 80 are increased too high, then the XDSL modem 28 may not be able to differentiate the test signals from other noise or interference on the customer wiring.

Likewise, decreasing the values of the resistors 72, 80 from 1000 ohms causes competing effects that may have to be balance. Decreasing the values of the resistors 72, 80 can increase the level of the test voltage received by the XDSL modem 28 on the customer premises 18. This can make it easier for the XDSL modem 28 to differentiate the test signal from noise. However, decreasing the resistor values may allow problems on the customer premises 18 have a greater impact on the level of the test signals received at the central office 12.

Figure 4A:
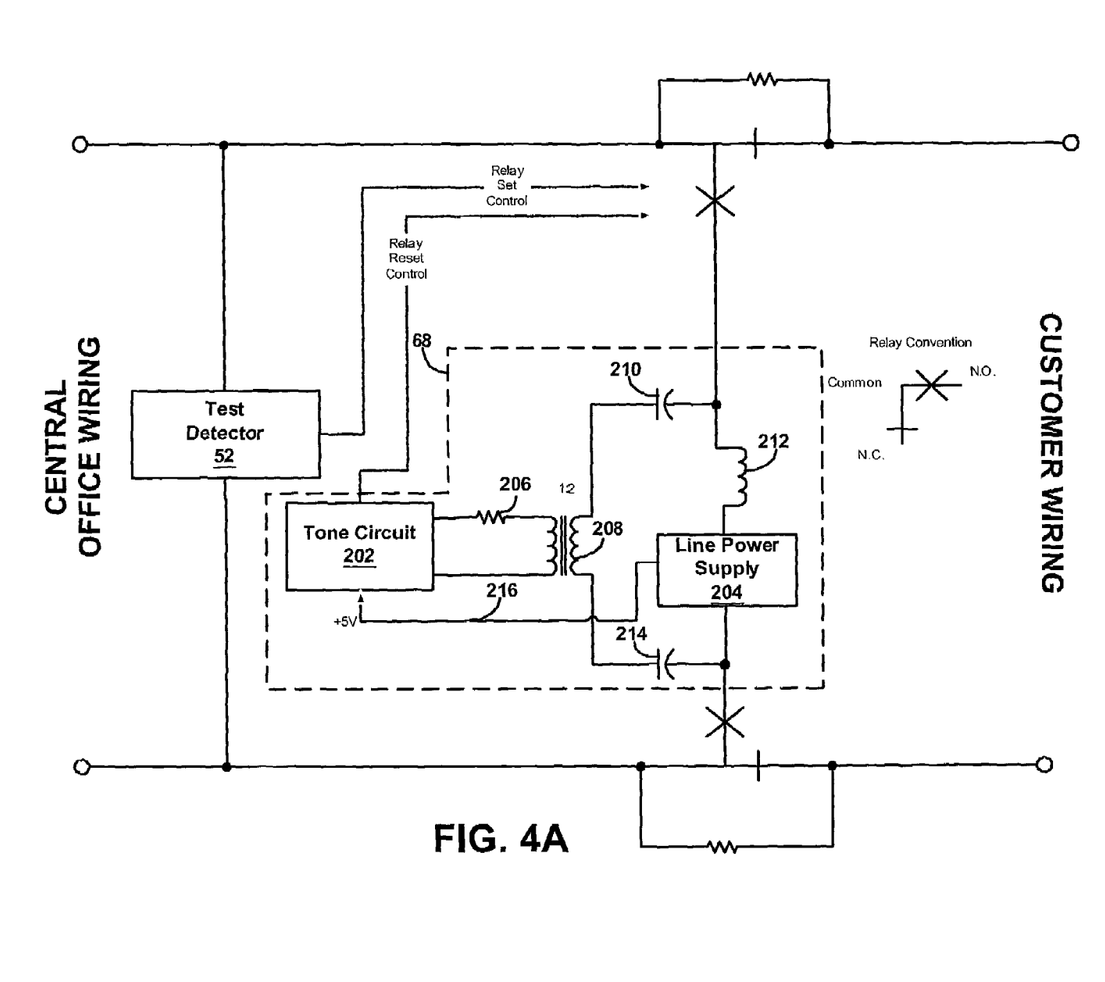
FIGS. 4A–B are circuit schematics of the network interface device of FIG. 2.

FIG. 4A shows a circuit schematic of one exemplary implementation of the test circuit 68. The test circuit 68 can include a tone circuit 202 and a line power supply 204. The tone circuit 202 can produce the test signal transmitted to the customer premises 18 and to the central office 12. The line power supply 204 can draw current from the transmission line 14, which can be connected to terminals 54 and 56. Once connected to the transmission line 14, the line power supply 204 can power the tone circuit 202, for example by connecting to the tone circuit 202 through a power line 216.

The test circuit can have various other components, such as a resistor 206, a transformer 208, an inductor 212 and capacitors 210, 214. The transformer 208 can be used for balance and isolation, such as to provide lightening and power cross protection. The inductor 212 can be used so that the line power supply 204 looks like a high impedance to the XDSL tones generated from the test circuit, thereby preventing the power supply 204 from loading down the signal. The capacitors 210, 214 can be used to DC block the office battery from the transformer 208 so that it does not saturate.

Figure 4B:
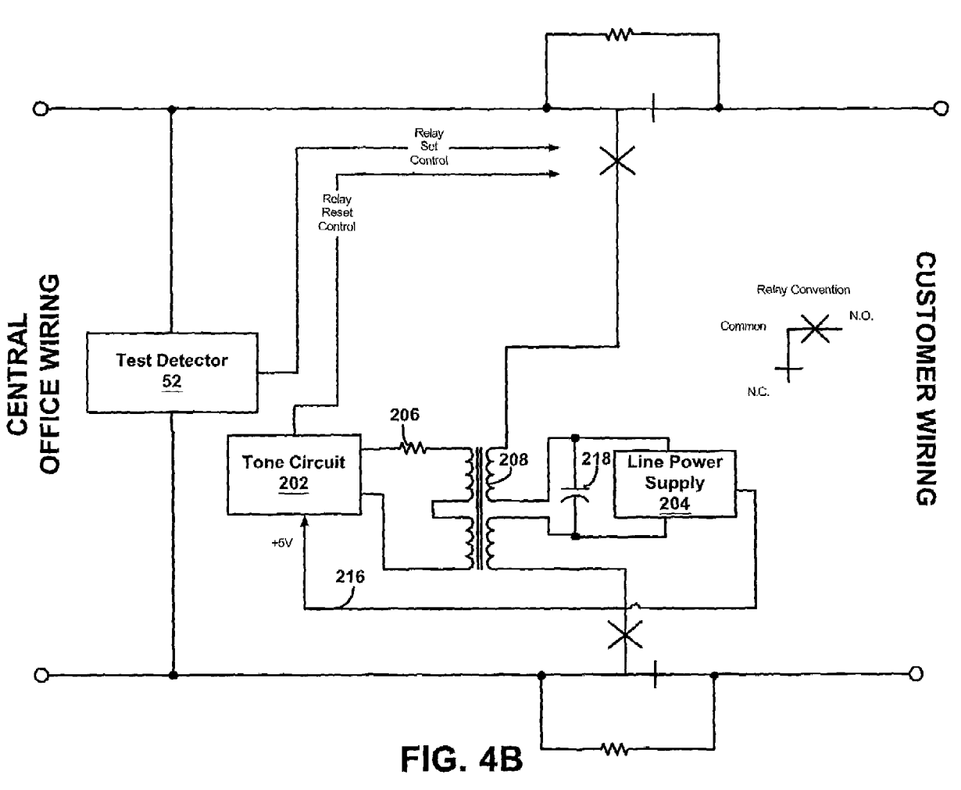

Other configurations are also possible. For example, FIG. 4B shows one alternate configuration using a transformer 208 that has a center tap on the central office side. A capacitor 218 connects across the center tap. DC current can flow through the transformer 208 to the line power supply 204. In this implementation, the transformer windings can act as an inductor and replace the inductor 212 used in FIG. 4A.

The implementation described in FIGS. 2–4, however, may be adversely affected by certain conditions at the central office 12. For example, the central office 12 side may have a large capacitance across tip and ring, such as a load coil. Load coils can be used on voice circuits to help provide voice frequency line equalization. Load coils can become capacitive in the ADSL frequency range and impair ADSL performance. Many ADSL circuits will generally not work in the presence of a load coil. In the test mode, the capacitance may attenuate both the signal on the central office 12 side and the customer premises 18 side. Then, the XDSL modem 28 may diagnose a problem on the customer premises 18 side when the problem was actually on the central office 12 side.

Figure 5:
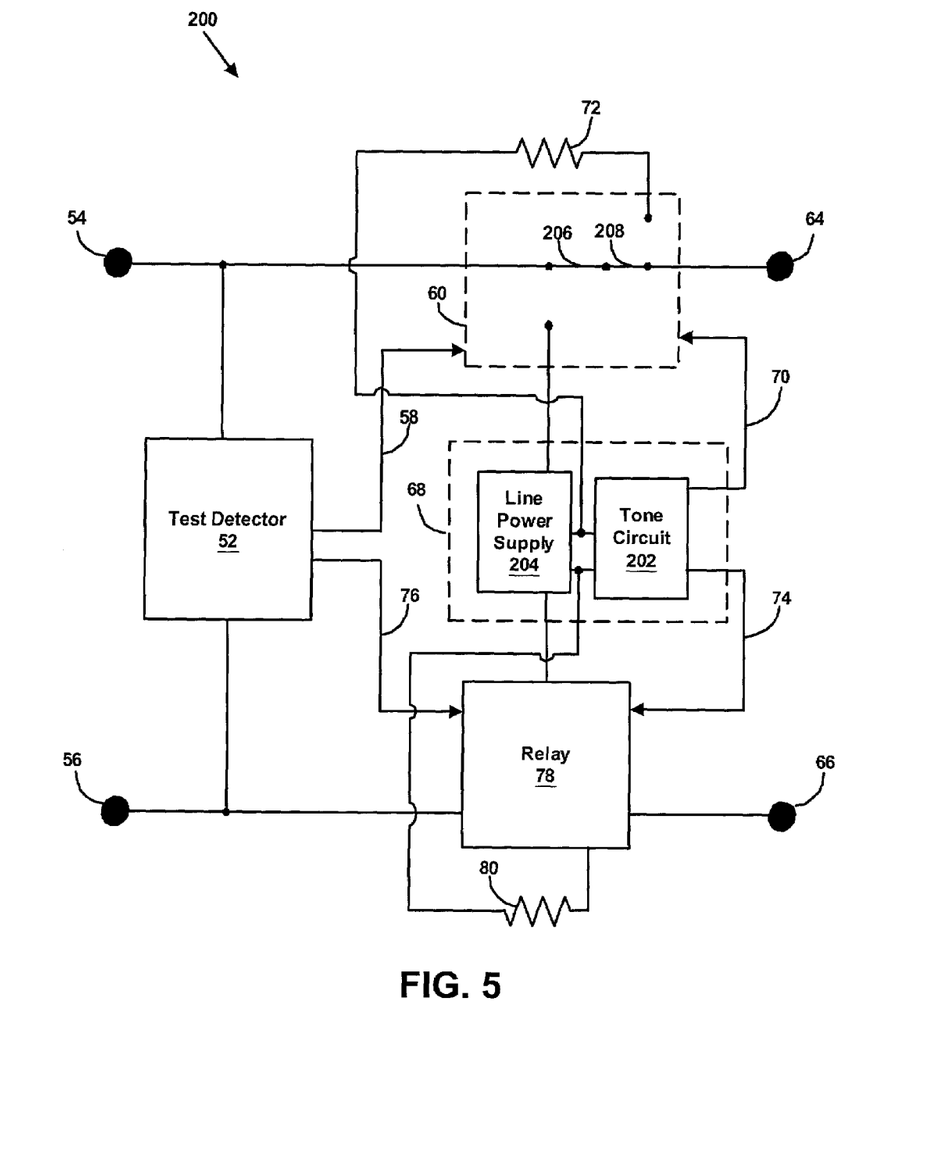
FIG. 5 is a block diagram of another implementation of a network interface device that can be used to test customer wiring and XDSL transmission lines connected to a central office.

The problems that may be caused by a capacitance emanating from the central office 12 can be substantially reduced by a variation of the configuration described in FIGS. 2–4. FIG. 5 depicts an alternate embodiment of the NID 14 in the normal operation mode that can be used to reduce the effects of capacitance emanating from the central office 12. The configuration in FIG. 5 is similar to the NID depicted in FIGS. 2–4. The test detector 52 connects across terminals 54 and 56. In the normal operation mode, terminal 54 connects with terminal 64, and terminal 56 connects with terminal 66. The connections between terminals 54 and 64 and between terminals 56 and 66 are made through two relays 60, 78.

The relay 60 can be a double pole, double throw relay. In the normal operation mode, relay pole 206 and relay pole 208 electrically connect terminal 54 and terminal 64. Relay 78 can also be a double pole, double throw relay, and it can connect terminals 56 and 66 in a similar manner. The test circuit 68 is disconnected from the terminals 54, 56, 64, 66 during the normal operation mode. This allows the NID 200 to pass signals between the central office 12 and the customer premises 18 without interference by the test circuit 68.

One terminal of the resistor 72 connects to an output of the line power supply 204, which is electrically connected to an output of the tone circuit 202. During the normal operation mode, the other terminal of the resistor 72 is not otherwise connected. Since one end of the resistor 72 is not connected during the normal operation mode, no current flows through the resistor 72 and it does not generally affect the operation of the NID 200. A similar operation occurs for the second relay 78, and the resistor 80 does not generally affect the operation of the NID 200 in the normal operation mode.

Figure 6:
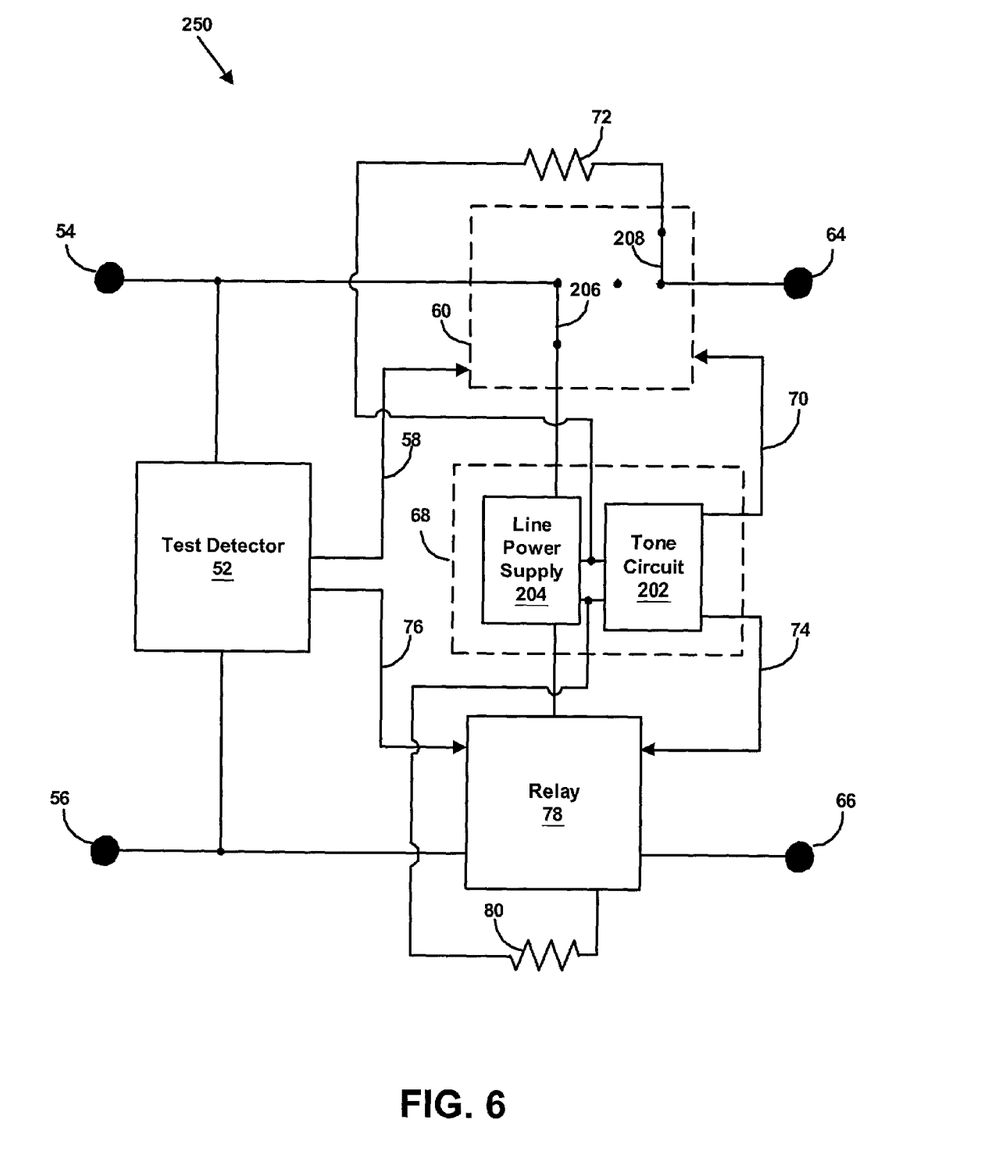
FIG. 6 is a block diagram of the network interface device of FIG. 5 in a test mode.

FIG. 6 shows the NID of FIG. 5 in the test mode 250. In the test mode, the relay 78 changes positions to connect the test circuit 68. Relay pole 206 moves to connect the test circuit 68 with terminal 54. Relay pole 208 connects the resistor 72 to terminal 64. Relay 78 operates in a similar manner to create a loop between the test circuit 68 and the customer premises 68 and between the test circuit 68 and the central office 12. Relay 60 can be controlled through a control line, and relay 78 can also be controlled by a control line 76. Preferably, the test detector 52 sends simultaneous signals to relay 60 and relay 78 so that the two relays 60, 78 move from the normal operating position to the test positions at the same time.

During the test mode, the tone circuit 202 can produce a test signal. The test signal can be sent from an output of the tone circuit 202 through the resistor 72 and to terminal 64, which can be connected to the customer premises 18. Similarly, the test signal can be sent from the other output of the tone circuit 202 through resistor 80 and to terminal 66, which can also be connected to the customer premises. This configuration forms a loop between the test circuit 68 and the customer premises 18. Both connections are preferably made simultaneously to couple the differential signal to the customer wiring.

The test signal produced by the tone circuit 202, however, does not flow through the resistor 72, back to terminal 54 and ultimately to the central office 12. As relay throws 206, 208 change positions to connect the test circuit 68, they electrically disconnect terminals 54 and 64. The gap created by the relay 72 prevents current from flowing through the resistor 72 and back to terminal 54. The test signal produced by the tone circuit 202, however, can be coupled to the central office 12 through the line power supply 204. The use of two double pole, double throw relays may prevent high frequency shorts on the facility side wiring from affecting the launch amplitude of the customer side test signal. Additionally, the two relays may also prevent high frequency shorts on the customer side from affecting the launch amplitude of the central office side test signal.

Figure 7:
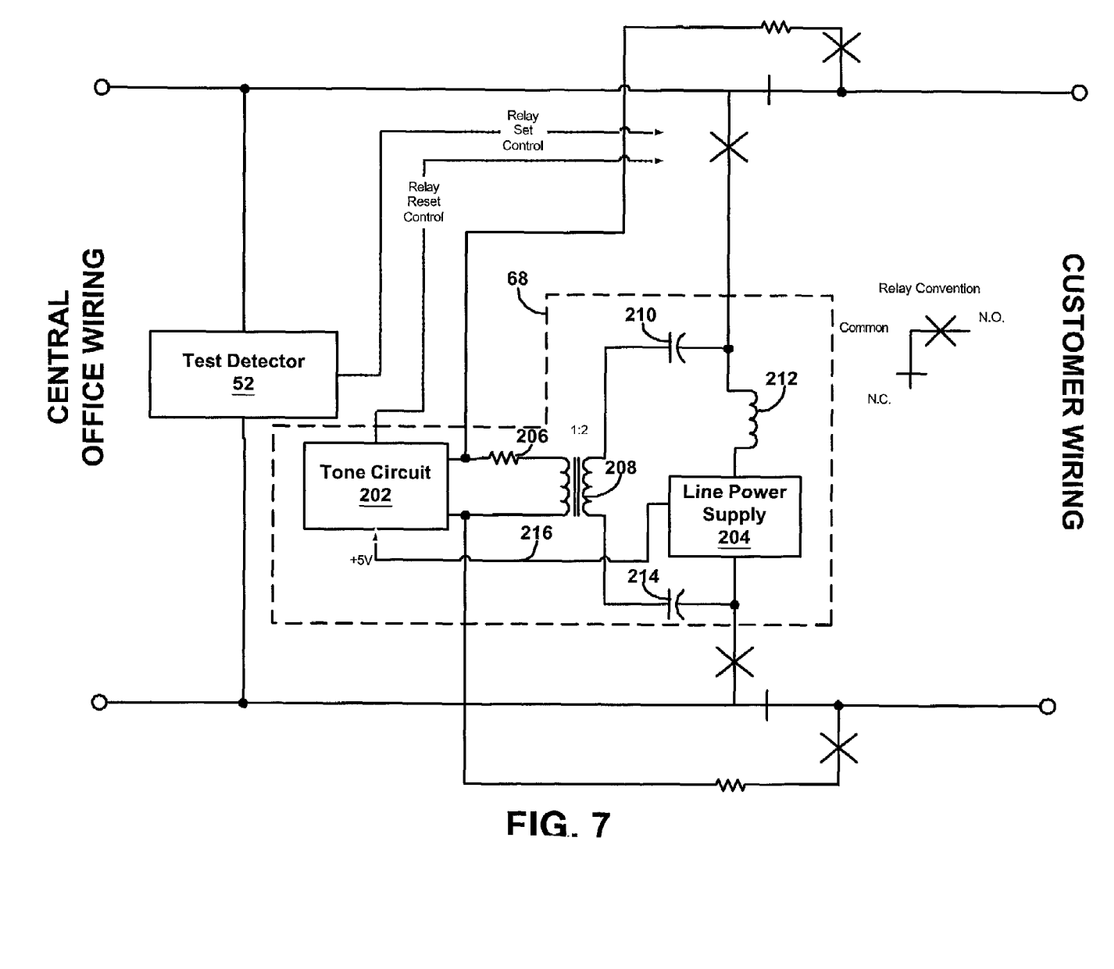
FIG. 7 is a circuit schematic of the network interface device of FIG. 4.

FIG. 7 shows a more detailed schematic of the NID depicted in FIGS. 5 and 6. FIG. 7 further illustrates the coupling of the test signal onto the transmission line 14. The tone circuit 202 connects to a transformer 208, and one output of the tone circuit 202 links to the transformer 208 through a resistor 206. The resistor 206 can terminate the transmission line in 135 ohms to minimize line reflections. The transformer 208 may be, for instance, a 1:2 transformer. The transformer connects through two capacitors 210, 214 to the two relays 72, 80. One terminal of the transformer 208 connects through the capacitor 210 to the relay 72, and the other transformer terminal connects through capacitor 214 to relay 78. The line power supply 204 connects through an inductor 212 to relay 72, and it connects directly to relay 78.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A network interface device for use in an XDSL transmission system, the network interface device comprising:

a test detector for detecting an indication to enter a test mode, the test detector having first and second test detector terminals, wherein the first test detector terminal connects to a first voltage node, and the second test detector terminal connects to a second voltage node;

a test circuit for providing a test signal to the XDSL transmission system during the test mode, the test circuit having first and second test circuit terminals, wherein the first test circuit terminal selectively connects to the first voltage node via a first connector, and wherein the second test circuit terminal selectively connects to the second voltage node via a second connector;

a third voltage node selectively connectable to the first voltage node, wherein the third voltage node connects to the first voltage node when the first test circuit terminal is disconnected from the first voltage node, and wherein the third voltage node is disconnected from the first voltage node when the first test circuit terminal connects to the first voltage node;

a fourth voltage node selectively connectable to the second voltage node, wherein the fourth voltage node connects to the second voltage node when the second test circuit terminal is disconnected from the second voltage node, and wherein the fourth voltage node is disconnected from the second voltage node when the second test circuit terminal connects to the second voltage node;

a first resistor connected across the first voltage node and the third voltage node; and a second resistor connected across the second voltage node and the fourth voltage node.

2. The network interface device of claim 1, wherein the first voltage and second voltage nodes interface with a first twisted pair transmission line connected to a central office, and wherein the third and fourth voltage nodes interface with a second twisted pair transmission line connected to a customer premises.

3. The network interface device of claim 1, wherein the test circuit comprises:
 a tone generator for generating the test signal during the test mode; and
 a line power circuit for drawing current from an XDSL transmission line connected to a central office, using the current to power the tone generator.

4. The network interface device of claim 1, wherein the first resistor and the second resistor each have a resistance of about 1000 ohms.

5. The network interface device of claim 1, wherein the first and second connectors are a double pole double throw relay.

6. The network interface device of claim 1, wherein the test detector is operably connected to the first connector.

7. The network interface device of claim 1, wherein the test circuit is operably connected to the first connector.

8. The network interface device of claim 1, wherein the XDSL transmission system is an ADSL transmission system.

9. A network interface device for testing transmission lines in an XDSL transmission system, the network interface device comprising:
 a test detector for detecting an indication to enter a test mode, the test detector having first and second test detector terminals, wherein the first test detector terminal connects to a first voltage node, and wherein the second test detector terminal connects to a second voltage node;
 a line power circuit for drawing current from a transmission line in the XDSL transmission system in order to produce power, the line power circuit having first and second line power circuit terminals, wherein the first line power circuit terminal selectively connects to the first voltage node via a first connector, and wherein the second line power circuit terminal connects to the second voltage node via a second connector;
 a tone generating circuit for providing a test signal to the XDSL transmission system during the test mode, the tone generating circuit having first and second tone generating circuit terminals, wherein the first tone generating circuit terminal connects to a third line power circuit terminal, wherein the second tone generating circuit terminal connects to a fourth line power circuit terminal, and wherein the tone generating circuit receives power from the line power circuit;
 a third voltage node selectively connectable to the first voltage node, wherein the first relay connects the third voltage node to the first voltage node when the first line power circuit terminal is disconnected from the first voltage node, and wherein the first relay disconnects the third voltage node from the first voltage node when the first line power circuit terminal is connected to the first voltage node;
 a fourth voltage node selectively connectable to the second voltage node, wherein the second relay connects the fourth voltage node to the second voltage node when the second line power circuit terminal is disconnected from the second voltage node, and wherein the second relay disconnects the fourth voltage node from the second voltage node when the second line power circuit terminal is connected to the second voltage node;
 a first resistor in series with a third line power circuit terminal and the first connector, wherein the first connector selectively connects the first resistor to the third voltage node; and
 a second resistor in series with a fourth line power circuit terminal and the second connector, wherein the second connector selectively connects the second resistor to the forth voltage node.

10. The network interface device of claim 9, wherein the first and second voltage nodes interface with a first twisted pair transmission line connected to a central office, and wherein the third and fourth voltage nodes with a second twisted pair transmission line connected to a customer premises.

11. The network interface device of claim 9, wherein the test detector can selectively engage the first and second connectors, and wherein the line power circuit can selectively disengage the first and second connectors.

12. The network interface device of claim 9, wherein the first resistor and the second resistor each have a resistance of about 1000 ohms.

13. The network interface device of claim 9, wherein the first and second connectors are each double throw double pole relays.

14. The network interface device of claim 9, wherein the test detector is operably connected to the first connector.

15. The network interface device of claim 9, wherein the tone generating circuit is operably connected to the first connector.

16. The network interface device of claim 9, wherein the XDSL transmission system is an ADSL transmission system.

17. The network interface device of claim 9, wherein the line power circuit is operably connected to the tone generating circuit through a transformer.

18. A method for testing an XDSL transmission system, the method comprising:
 receiving an indication to enter a test mode;
 responsively sending a test signal over an XDSL transmission line connected to a central office, wherein the test signal is sent for a predetermined amount of time;
 selectively engaging an impedance to isolate the central office from a customer premises; and
 sending the test signal over an XDSL transmission line connected to the customer premises, wherein the test signal is sent through the impedance, and wherein the test signal is sent for the predetermined amount of time.

19. The method of claim 18, further comprising:
 selectively disengaging the impedance after the predetermined amount of time.

20. The method of claim 18, wherein receiving an indication comprises:
 receiving an indication from the central office.

21. The method of claim 18, wherein receiving an indication comprises:
   receiving an indication from an ADSL modem located on the customer premises.

22. The method of claim 18, wherein the indication is a battery short.

23. The method of claim 18, wherein the test signal is a predetermined sequence of tones from 25 KHz to 1 MHz.

24. A method for testing XDSL wiring in a customer premises, the method comprising:
   receiving at the customer premises a test signal from a test generation circuit through a selectively engagable impedance that isolates the customer premises from a central office, wherein the test signal is sent for a predetermined amount of time;
   detecting at least one tone in the test signal;
   measuring an amplitude of the at least one tone; and
   comparing the amplitude of the at least one tone with an expected value.

25. The method of claim 24, further comprising:
   sending the test generation circuit an indication to send the test signal.

26. The method of claim 24, further comprising:
   selectively disengaging the impedance after the predetermined amount of time.

27. The method of claim 24, further comprising:
   displaying a user interface;
   receiving through the user interface an indication to enter a test mode; and
   sending the test generation circuit an indication to send the test signal.

28. The method of claim 24, wherein detecting at least one tone comprises:
   detecting a predetermined sequence of tones; and
   measuring an amplitude of each tone in the predetermined sequence of tones.

29. The method of claim 28, wherein detecting a sequence of tones comprises:
   detecting a sequence of tones in the range of 170 KKz to 1 MHz.

30. The method of claim 24, wherein the expected amplitude is about negative 26 dBm.

31. The method of claim 24, wherein the XDSL wiring is ADSL wiring.

* * * * *